UNITED STATES PATENT OFFICE.

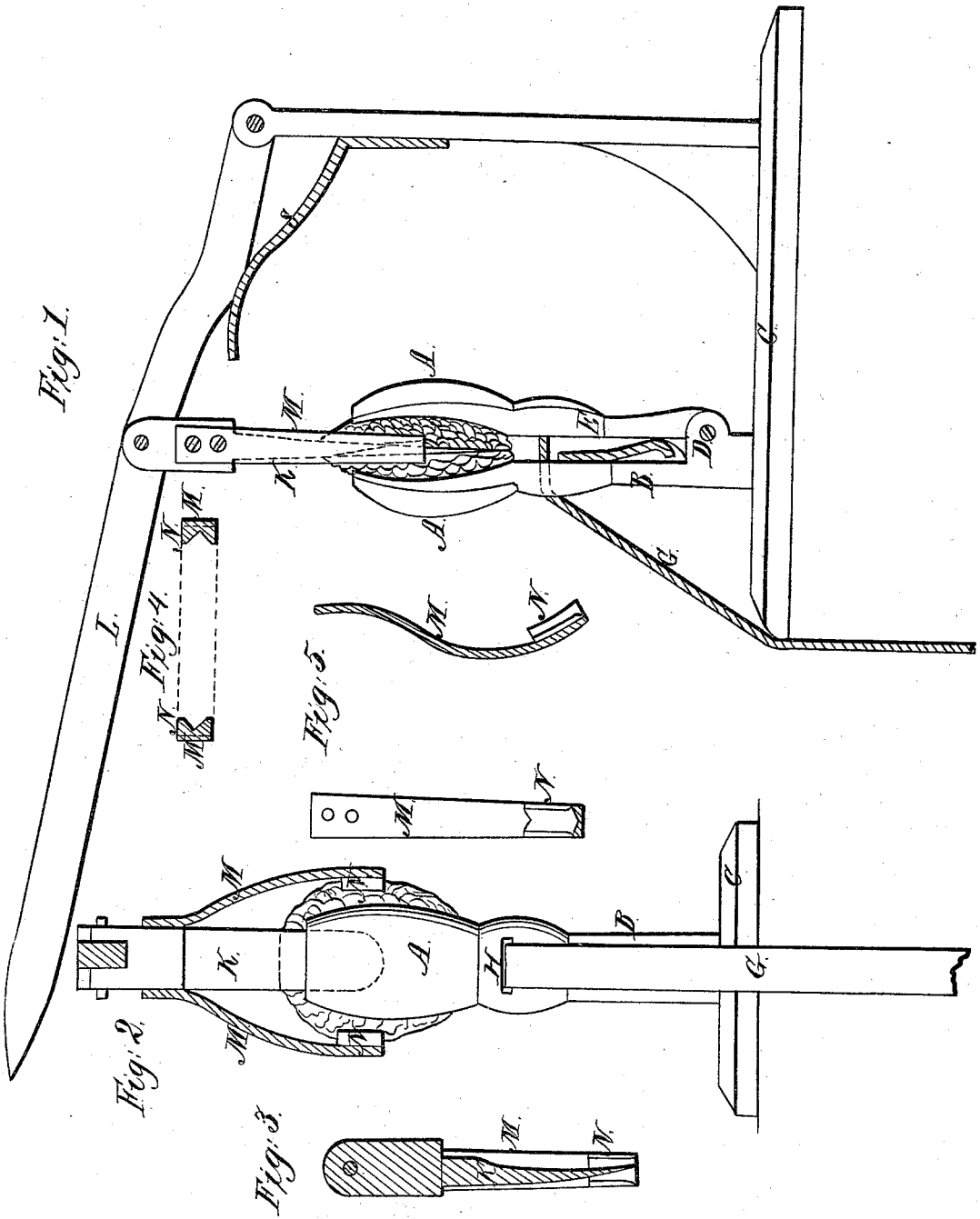
W. H. Towers,
Oyster Opener,
Nº 10,810,     Patented Apr. 18, 1854.

WM. H. TOWERS, OF PHILADELPHIA, PENNSYLVANIA.

IMPROVED MACHINE FOR OPENING OYSTERS.

Specification forming part of Letters Patent No. 10,810, dated April 18, 1854.

*To all whom it may concern:*

Be it known that I, WILLIAM H. TOWERS, of the city and county of Philadelphia, and State of Pennsylvania, have invented a new and useful Machine for Opening Oysters and other Bivalves, which is described as follows, reference being had to the annexed drawings of the same, making part of this specification.

Figure 1 is a side elevation of the machine. Fig. 2 is a front view of the machine, represented, as in Fig. 1, in the act of opening an oyster. Fig. 3 is a vertical section of the suspended knife and spring-guide. Fig. 4 is a horizontal section of the spring-guides when extended. Fig. 5 is a side and front view of the spring-guides when contracted.

Similar letters in the figures refer to corresponding parts.

The nature of this invention and improvement consists in tightly embracing the oyster to be opened between jointed metallic jaws, made to somewhat resemble the convex sides of the same, and forcing and guiding a knife between the shells of said oyster in such a manner as to divide the shells, and at the same time cut the eye of the oyster and enable it to be removed without injury to the hands and with much less difficulty than heretofore.

To enable others skilled in the art to make and use my invention, I will proceed to describe its construction and operation.

The jaws A for embracing the oyster are made concave on the sides next each other to about the form of an ordinary-sized oyster, somewhat after the manner of the dish of a spoon, and the shank B of one is fixed permanently in an upright position to any suitable foundation, C, and has ears D projecting from near the lower end of one of its faces to admit the shank E of the other jaw to be jointed to the same, and the two are of such relative lengths as to cause their jaws or impinging parts to come opposite each other when brought toward each other.

The jaws are held apart to receive the oyster by means of a curved spring, F, interposed between their shanks, and are brought together to clamp the oyster firmly by a strap, G, attached to the shank E near the jaw, and passing through a slot, H, in the shank B and over and below the end of the foundation, where it may be fitted to a stirrup or treadle, as fancy may dictate, to be operated upon by the foot.

Immediately above the jaws is arranged a tongue-shaped knife, K, suspended by a pin, upon which it can move back and forth to a lever, L, having a fulcrum at one end in an upright, I, secured in the foundation-piece to which the shanks of the jaws are fastened, and is rounded to form a handle, by which it is raised and depressed at the opposite end, which is situated the required distance from the knife to give the necessary purchase to open the oyster. On the sides of this knife are attached semi-elliptical springs M, (one on each,) to the lower ends of which are secured metallic blocks N, having gutters or V-shaped channels facing each other, and curving or flaring wider and deeper at their lower ends, for the purpose of more readily enabling the edges of the oyster, when confined between the jaws, to enter the said channels or gutters in their descent immediately after the knife has entered the uppermost portion of the crack between the shells of the same.

The knife extends a short distance below the spring-blocks, and is gradually curved from its upper to the lower end, where it is brought to an edge, the curvature on one surface being convex and on the other concave, so as to give it a gradual bend or curvature backward out of a vertical line and bring its lower edge back of the centers of the channels, and by this means cause said edge to follow the inner surface of the back shell of the oyster and cut the eye of the same in its descent.

In operating with the machine, the upper edge of the oyster is first broken off to allow an entrance to the edge of the knife, (when a crack at this part is not visible,) and is clamped in the manner before stated, and the knife is depressed by the lever sufficiently far to cut the eye of the oyster, and the two shells are disengaged at the hinged part of the same. The knife is then allowed to ascend and clear itself by the action of the spring *s* upon the under curved surface of the lever L, and the foot is disengaged from the stirrup or treadle, as the case may be, to enable the oyster to be removed and another substituted to undergo the same operation.

Instead of fixing the stationary shank B and its jaw in a vertical position, they may be arranged horizontally, with the other parts altered to correspond.

What I claim as my invention, and desire to secure by Letters Patent, is—

Opening oysters and other bivalves without injury to the hands by firmly inclosing them between jaws, and forcing a knife, having spring-guides on its sides of the form described, between the shells, in the manner herein set forth.

WILLIAM H. TOWERS.

Witnesses:
STEPHEN K. SIMMONS,
JOHN DUNCAN.